Dec. 28, 1954  H. J. MODREY ET AL  2,698,423
ELECTRICAL TERMINAL STRIP AND ELECTRICAL TERMINAL ASSEMBLY
Filed March 18, 1952  3 Sheets-Sheet 1
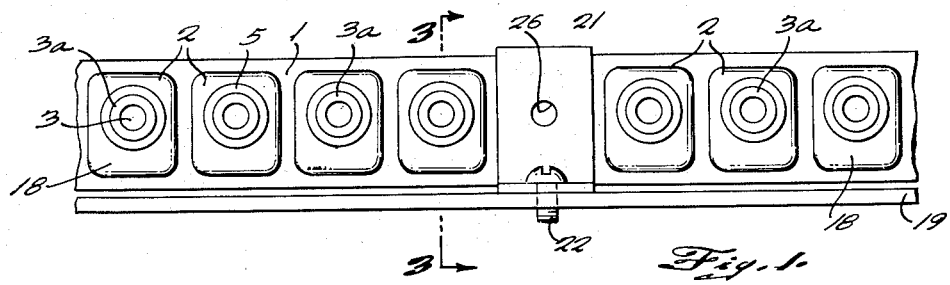
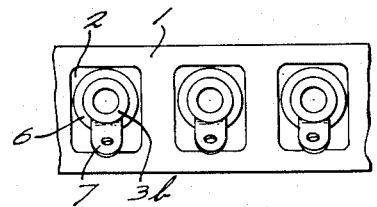
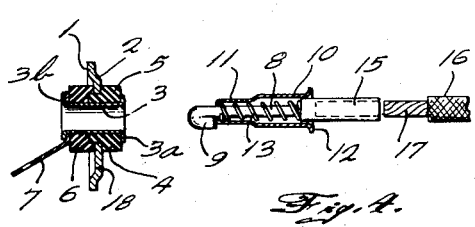 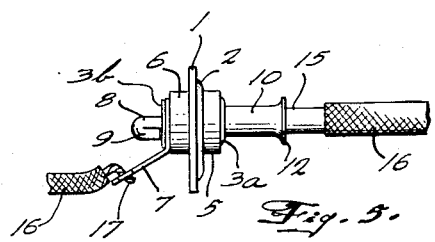
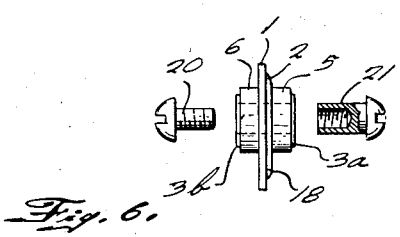 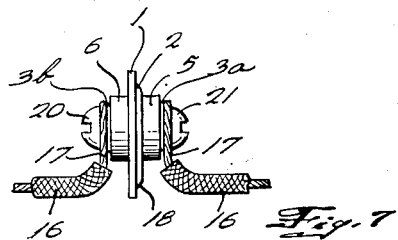
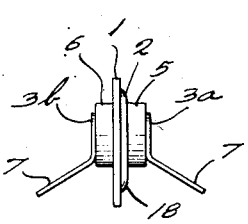 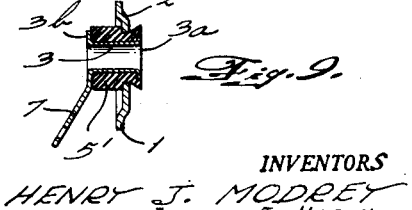
INVENTORS
HENRY J. MODREY
JOSEPH F. HEALY
BY
ATTORNEY.

Dec. 28, 1954  H. J. MODREY ET AL  2,698,423
ELECTRICAL TERMINAL STRIP AND ELECTRICAL TERMINAL ASSEMBLY
Filed March 18, 1952  3 Sheets-Sheet 2

INVENTORS
HENRY J. MODREY
JOSEPH F. HEALY
BY
ATTORNEY

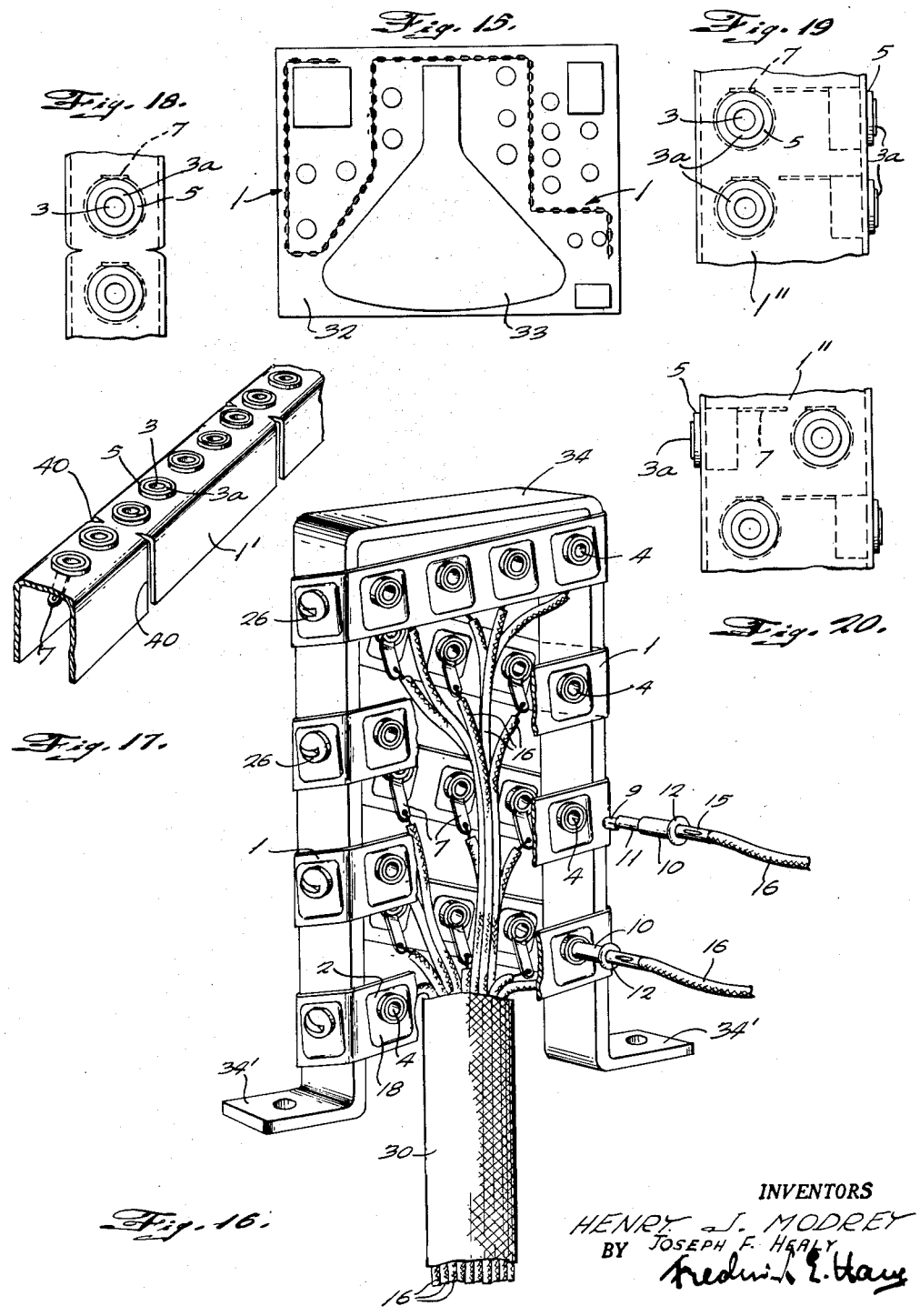

United States Patent Office 2,698,423
Patented Dec. 28, 1954

2,698,423

ELECTRICAL TERMINAL STRIP AND ELECTRICAL TERMINAL ASSEMBLY

Henry J. Modrey, North Stamford, and Joseph F. Healy, Westport, Conn., assignors to Interlock Corporation, New York, N. Y.

Application March 18, 1952, Serial No. 277,136

5 Claims. (Cl. 339—214)

This invention relates to electrical terminal strips for establishing one or more electric connections.

Terminal strips, as hitherto known, are generally in form of a straight rigid strip made of plastic or other insulation material which carries one or more terminals of the screw, solder or crimp type. In use, electric wires are connected to one side of the terminal and further connections are made from the other side of the terminal. Strips of this type are supplied as units carrying the desired number of terminals or as strips of standard length which are cut in accordance with the required number of terminals.

The rigidity of conventional straight terminal strips imposes inconvenient limitations upon the usefulness of terminal strips as hitherto known.

One of the objects of the present invention is to provide a novel and improved terminal strip which can be easily bent before and during installation and which substantially retains or preserves any contour or shape in which it may be bent. This property of the strip is hereinafter sometimes referred to as "form-preserving."

The pliability or flexibility and the form-preserving property of terminal strips according to the invention permit shaping and bending of the strips in conformity with the layout of a specific installation as will be more fully explained hereinafter. This affords, among others, the important advantage that the configuration of the strip, and hence the location of the terminals can be easily adapted to the specific requirements of the installation in which the strips are used.

Another object of the invention is to provide a terminal strip which can be manufactured in form of a strip of practically unlimited length. This affords the advantage that the strips can be stored in form of coils from which a length of the strip including any desired number of terminals is cut off or otherwise separated. As will be apparent, strips of this type can be conveniently and inexpensively manufactured and stored.

Another object of the invention is to provide novel and improved means by which the strip terminals can be clearly and durably marked. This is of particular importance in connection with multi-wire installations and causes considerable difficulties with conventional strips.

Another object of the invention, allied with the preceding ones, is to provide a novel and improved bracket or support to which one or more terminal strips according to the invention can be safely and conveniently fastened in different positions and which in turn can be easily and securely fastened to a base.

Other and further objects, features and advantages of the invention will be pointed out hereinafter and set forth in the appended claims forming part of the application.

In the accompanying drawing several now preferred embodiments of the invention are shown by way of illustration and not by way of limitation.

In the drawings:

Fig. 1 is a fragmentary plan view of a terminal strip according to the invention vertically mounted on a bracket according to the invention.

Fig. 2 is a plan view upon the opposite side of a strip according to Fig. 1.

Fig. 3 is a section taken on line 3—3 of Fig. 1.

Fig. 4 is a sectional side view of a connector plug suitable for use in connection with the terminals of the strip.

Fig. 5 is a side view showing the plug of Fig. 4 applied to the terminal of Fig. 3.

Fig. 6 is another view of the terminal of Fig. 3 and of contact screws suitable to be fitted in the terminal.

Fig. 7 is a terminal of Fig. 6 completely wired.

Fig. 8 shows the terminal of Fig. 3 with terminal tails at both sides.

Fig. 9 is a sectional view of a modification of the terminal of Fig. 3.

Fig. 15 is a diagrammatic plan view of a television chassis wired with a form fitting terminal strip according to the invention.

Fig. 16 is a perspective view of a turret frame supporting a plurality of terminal strips according to the invention employed to connect a multi-wire cable.

Fig. 17 is a fragmentary perspective view of a modification of a terminal strip according to the invention.

Fig. 18 is a plan view of Fig. 17.

Fig. 19 is a fragmentary plan view of a modification of the strip according to Figs. 17 and 18, and Fig. 20 is a fragmentary plan view of a further modification of a strip according to Figs. 17 and 18.

Figure 10:
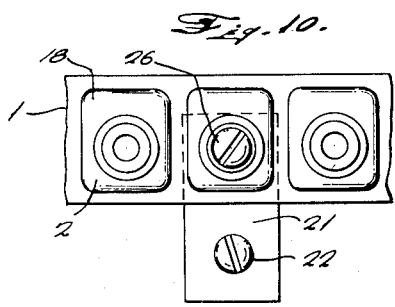
Fig. 10 is a fragmentary plan view of a terminal strip according to the invention horizontally mounted on a bracket according to the invention.

Referring first to Figs. 1, 2 and 3 in detail, the terminal strip according to these figures comprises a comparatively narrow pliable or flexible sheet metal strip 1 which may have any desired length and which may be visualized as a continuous strip suitable for shipping and storing in form of coils before being cut down to the required length for an intended installation. The strip may be made of any suitable metal which can be conveniently bent and has sufficient stiffness to preserve any desired form. Generally, aluminum is the most preferred material but other metals such as steel may also be used in certain instances. The strip is formed with closely spaced raised or depressed portions 2. The purpose of these indented portions is to stiffen the thin strip and further to insure that any bending or other deformation of the strip occurs between adjacent raised or depressed portions 2, that is, between the terminal contacts carried by the strip. A hole 4 is provided through each strip portion 2. The punching of these holes and the formation of the indented portion 2 can be conveniently carried out in one operation during the manufacture of the strip. The holes 4 serve to receive the strip terminals. These terminals are shown as comprising an insulation eyelet which may be formed by two complementary sections 5 and 6 which are fitted to the respective strip portion 2 from both sides of the strip and are so dimensioned that they overlay somewhat the diameter of the respective strip hole 4 as can best be seen on Fig. 3. Any suitable insulation material can be employed for eyelets 5, 6. It has been found that insulation material now known as nylon is highly suitable.

The terminal proper is formed by a metal sleeve or eyelet 3 the end flanges 3a and 3b of which overlay the respective end faces of the eyelet sections 5 and 6 thereby securing eyelet 3 within the insulation eyelet and also joining the two sections of the insulation eyelet together and to the base strip. Eyelet 3 is inserted with one of its flanges already turned over. The other flange is then punched or spun over. As will be apparent, this operation completes the terminal. While for sake of simplicity of illustration terminals with a single contact are shown, it will be evident that terminals with more than one contact can be mounted on the flexible base strip. The term "terminal," as used herein, is therefore intended to include terminals with one or more contacts.

The electric connections to and from the terminals can be made by various means suitable for the purpose either on opposite sides of the terminals or on the same side. According to Fig. 3, one of the connections is made by means of a soldering tail or lug 7 which may form part of the eyelet flange 3b or is secured thereto. The second connection may be made by using contact eyelet 3 as the receiving pole element of a connector outlet. The connector plug coacting with the outlet formed by the terminal may be of conventional design but when the terminal strip is used in installations in which a high contact quality is required and/or in which the terminal strip is or may be subjected to vibration, it is advantageous to use as connector plug a self-locking plug of the kind fully described in my co-pending application Ser. No. 173,733 filed on July 7, 1950, and shown in Fig. 4 of the present application in somewhat diagrammatic form. The connector plug according to Fig. 4 comprises a clamping rod 8 made of a strong wire and forming on one end an enlarged clamping head 9 by bending the rod back upon itself. The other end of the clamping rod is fastened to a contact sleeve 15 in which is inserted the bared end 17 of a wire 16. The wire end may be secured in sleeve 15 by any suitable means such as soldering or crimping. Rod 8 is slidably guided in a casing 10 the front end 11 of which is reduced in diameter and closed by an end wall. Clamping head 9 is biased by a spring 13 against the end wall of casing portion 11 and overhangs the same one-sidedly or eccentrically. An outwardly turned flange 12 of casing 10 serves as a grip for withdrawing casing 10 relative to the clamping rod 8 and contact sleeve 15 thereby causing the clamping head and the part of rod 8 just below the clamping head to protrude from casing portion 11 for a purpose which will be more fully explained hereinafter.

To make the terminal of Fig. 3, more specifically the contact eyelet 3, suitable for coaction with the plug of Fig. 4, the inner cross-section of eyelet 3 must be so selected in relation to the cross-sectional configuration of clamping head 9 and also of casing portion 11 that both the clamping head and casing portion 11 are positively guided by eyelet 3 when inserted in the same. In practice, eyelet 3 may be cylindrical and casing portion 11 may also be cylindrical so that the outer diameter of casing portion 11 just fits the inner diameter of eyelet 3. The clamping head may have a round or a flat cross-section in which latter case the transverse width of the clamping head should substantially match the inner diameter of eyelet 3. A further requirement is that the axial length of casing portion 11 is somewhat shorter than the axial length of sleeve or eyelet 3.

When it is desired to apply the plug to the terminal outlet the operator grips sleeve 15 and after inserting the clamping head in eyelet 3 pushes the plug toward the outlet or jack. As a result, casing 10 is forced back relative to the clamping rod by the pressure of the end wall of casing portion 11 against eyelet flange 3a thereby further loading spring 13. Consequently, clamping head 9 penetrates deeper into eyelet 3 thereby making space available for casing portion 11 which finally seats itself in eyelet 3 when clamping head 9 has passed completely through the eyelet and abuts with its overhanging portion against flange 3b. The final position of the plug is shown on Fig. 5. By reason of casing portion 11 having a shorter axial length than eyelet 3, the clamping head 9 is held protruding from casing portion 11 by the difference between the axial length of eyelet 3 and casing portion 11 so that head 9 is pressed against flange 3b by the loading of spring 13. As will be apparent, a pressure contact is made between the end of clamping head 9 abutting against flange 3b and also between flange 3a and the shoulder formed between casing portion 11 and the wider portion of the casing. Extensive tests have shown that these pressure contacts constitute a connection of extremely low and constant resistance value. The resistance value remains practically unchanged even under vibration since a reduction of the contact pressure between the clamping head and flange 3b by the effect of vibration is automatically compensated by a corresponding increase of the contact pressure between the shoulder of the casing and eyelet flange. 3a. There is or may also be contact between the wall of casing portion 11 and the inner wall of eyelet 3 but this contact, being a sliding contact, is of uncertain value and may be disregarded in installations such as electronic installations in which high quality contact is required.

Figs. 6 and 7 show an arrangement in which two wires 16 are connected by means of contact screws 20 and 21. As can best be seen on Fig. 6, screw 21 has an internal thread which serves to receive the external thread of screw 20.

According to Fig. 8 terminal tails 7 are provided on each side of contact eyelet 3. The wires to be connected can then be screwed, soldered or spot welded to these tails.

It will be understood from the previous description that the illustration of the contact connections between wires and a terminal according to Fig. 3 is by no means exhaustive but that various other means of connection are conceivable with terminal strips according to the invention.

Fig. 9 shows a modification of the terminal of Fig. 3 in that the sectional insulation eyelet of Fig. 3 is replaced by a single insulation eyelet 5'. This eyelet serves to receive and is held in position by contact eyelet 3. As will be apparent, eyelet 5' is inserted with its flange 3b bearing tail 7 already turned over. The turning of flange 3a secures the contact eyelet in eyelet 5' and also serves to expand the insulation eyelet sufficintly so as to secure the same to the base strip.

In case the strip 1 is made of aluminum, the same is preferably given an anodized finish. A steel strip is preferably lacquered with a suitable insulation lacquer. A finish of this type affords a certain amount of electrical insulation which protects against an accidental or casual contact during the installation and is also useful in protecting the material of the base strip. A further advantage is that it can be used to provide different coloring of several base strips used within one installation thereby permitting group coding of the terminal strips. The main advantage, however, resides in providing convenient means for marking the terminals. In most multi-wire installations, all terminals must be marked. The conventionally used small stick-on labels have the disadvantage that they become easily detached because the available surface is extremely small. With a coated metal strip, the required marking can be effected by scratching or etching the terminal denomination into the metal of the strip. As the coating is colored and the underlying metal is bright, the terminal denomination, even if very small, is distinctly readable and can never become detached or otherwise lost. For the purpose of marking the terminals, a space 18 may be provided as marking area within each raised or depressed strip portion 2 as can best be seen on Fig. 1.

The terminal strip, as hereinbefore described, can be mounted on a base by various suitable means. It can be secured either directly to the base, such as a panel, or it can be supported on the base by means of one or more brackets. As previously mentioned, the design of a bracket particularly suitable for mounting terminal strips according to the invention and also in certain instances of terminal strips of a kind other than described herein constitutes part of the present invention. The terminal strip of Fig. 1 is mounted in vertical position on a bracket according to the invention which will now be described in connection with Figs. 10 and 11.

Figure 11:
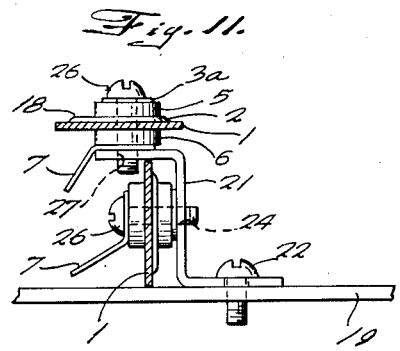
Fig. 11 is an elevational side view of a bracket according to the invention carrying two terminal strips, one in horizontal position and the other in vertical position.

Fig. 10 shows a terminal strip of the kind described in connection with Fig. 1 mounted in horizontal position on a bracket according to the invention. The bracket itself can best be seen on Fig. 11. While the bracket of Fig. 10 is shown as supporting two strips 1, one in horizontal position and the other in vertical position, it should be understood that one strip only, either in horizontal or vertical position, may be mounted on the bracket. The bracket comprises a double right-angle or double L-shaped strip 21 made of any suitable material such as sheet metal. The bracket strip is provided in its vertical limb with a tapped hole 24 and in its upper horizontal limb with a second tapped hole 27. These holes serve to fasten the terminal strips 1 to the bracket by passing screws 26 through respective eyelets 3 of the terminal strips. For this purpose, holes 24 and 27 may be threaded, as shown, or a nut may be screwed upon the protruding portions of screws 26. Screws 26 are so dimensioned that they fit the eyelets 3 so that each eyelet of the terminal strip can either serve as a connection point or as a guide bushing for a fastening screw. This affords the important advantage that points of attachment of the terminal strips to the brackets can be selected wherever they are required. Such a free choice of the points of attachment is not available with conventional plastic terminal strips by reason of the fact that the fastening holes of such strips are molded in the plastic body and are therefore inflexible as to distance. This advantage of strips and brackets according to the invention is of particular importance because the terminal strips according to the invention may be laid out in curves.

In the previous description it has been stated that a terminal strip is mounted either horizontally or vertically. However, it should be understood that the same strip can also be mounted partly horizontally and partly vertically by twisting the strip through an angle of 90° between two brackets.

Each bracket is secured to a base plate 19, generally a chassis, by any suitable means such as a screw 22 threaded through the lower horizontal limb of the bracket.

Figure 12:
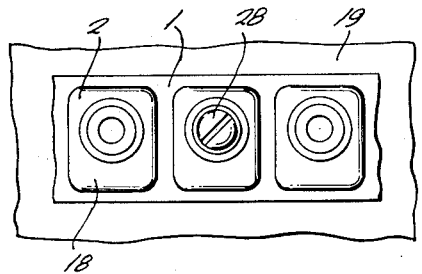
Fig. 12 is a fragmentary plan view of a terminal strip according to the invention directly screwed to a panel.
Figure 13:
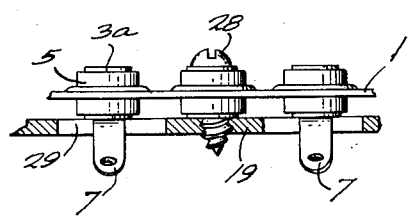
Fig. 13 is a side view of Fig. 12, partly in section.

Figs. 12 and 13 show an arrangement in which a terminal strip 1 is directly secured to base panel 19. For this purpose, the base panel is provided with a corresponding number of holes 29 through which the soldering tags or tails 7 of the individual terminal contacts protrude, ready for wiring. A screw 28 again fitted through one of the eyelets 3 serves to secure the strip to the base 19. It is of course also possible to employ a bolt and a nut instead of the illustrated screw. Furthermore, it will be apparent that with the arrangement of Figs. 12 and 13 also, each contact eyelet 3 may either serve as electric connection point or as fastening hole.

Figure 14:
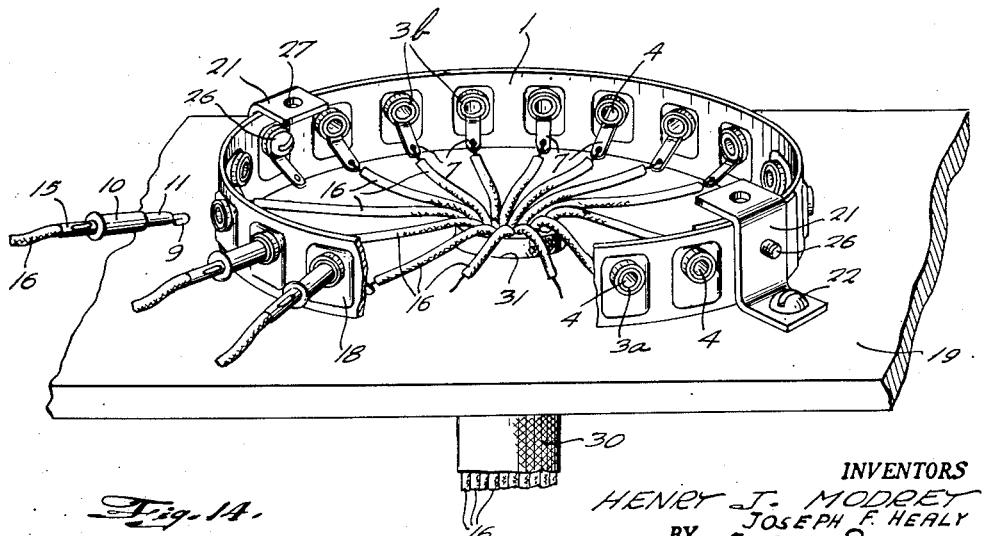
Fig. 14 is a perspective view of an installation in which a circular terminal strip according to the invention is employed to connect a centrally entered multi-wire cable.

Fig. 14 shows an assembly in which a terminal strip and brackets according to the invention are employed to connect the individual wires of a multi-wire cable. For this purpose, a length of terminal strip including the required number of terminal contacts is bent into a ring which is secured in vertical position to a chassis or base plate 19 by means of brackets 21 and screws 22 and 26 as has been described in connection with Fig. 11. As will be noted, the screw 26 of the right hand bracket also serves to join the overlapping ends of the strip by simply passing screw 26 through two eyelets 3 brought in registry. While two brackets are shown, it will be apparent that the actual number of brackets is selected in accordance with the requirements of the specific installation. The multi-wire cable, designated by 30, is entered through a preferably centric hole 31 in plate 19. Each individual wire 16 of the cable is soldered to one of the tags 7 thereby establishing the one connection with the terminals of the strip. The second connection is shown as being made by employing a self-locking plug as has been described in connection with Figs. 4 and 5 but, of course, it is also possible to make the connections by the contact means described in connection with Figs. 6, 7 and 8 or by any other suitable means.

As will be apparent, the arrangement of Fig. 14 results in a convenient and compact distributing center made possible by the flexibility and form stability of terminal strips according to the invention and by the design of the brackets according to the invention.

Fig. 15 illustrates diagrammatically an installation in which a terminal strip as hereinbefore described is laid out to follow a rather complex contour. More specifically, the terminal strip is twisted between the various components of a television chassis 32 supporting a television tube 33. The layout of the terminal strip 1 permits to bring the individual numerous wires of the installation in close proximity to all the components of the installation.

Fig. 16 shows an installation particularly useful for the termination of telephone or other multi-wire cables and made possible by the specific features of a terminal strip according to the invention.

The installation of Fig. 16 comprises a substantially U-shaped frame 34 made of any suitable material such as steel. The frame should be visualized as being secured to a base for instance by screws passed through holes in end flanges 34' of the frame. A terminal strip 1 is wound about the frame in a progressive or spiral shaped fashion and the individual wires of cable 30 are again soldered to the tags 7 of the strip contacts. As will be noted, cable 30 enters the center of the turret formed by frame 34. The strip is fastened to the frame by means of screws 26 as has been previously described. The soldering operations can be facilitated by winding the strip around the frame 34 layer by layer as the soldering of wires 16 progresses. The outer connections can again be made by plugs according to Figs. 4 and 5. Also, any of the contact means described in connection with Figs. 6, 7 and 8 may be employed to secure the cable wires 16 to the terminals.

All the previously described exemplifications of the invention show flat base strips. However, in certain instances a greater rigidity of the strip is required than can be given to a flat strip without unduly reducing the convenient pliability of the strip. Such greater rigidity may be obtained by employing a channeled strip. Various forms of channeling can of course be employed.

Figs. 17 and 18 show a metal base strip made of aluminum or steel with a substantially U-shaped cross-section. Such strip, if made of sufficiently thin sheet metal, may again be bent or otherwise deformed so as to form desired curves and angles. However, if a greater pliability be desired than a channeled strip normally possesses, spaced slots 40 may be provided in one or both side branches of the strip and also in the bight of the strip.

A channeled strip also affords the important advantage that one or both side arms of the strip can be used to mount terminals.

Fig. 19 shows a channeled strip 1" provided with terminals on its bight and one of its side arms.

Fig. 20 shows a channeled strip 1" both side arms of which support terminals. In this case the terminals supported on the bight of the strip are preferably staggered.

The strip design according to Figs. 19 and 20 permits to accommodate a greater number of terminals on a given length of the strip than a flat strip.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A stock material for electrical terminal strips comprising a base strip in form of a continuous metal strip manually bendable to conform to a desired service shape but sufficiently rigid to hold its bent shape and easily severable in units of desired length, the said strip being formed with a plurality of longitudinally spaced indented strip portions for stiffening the said indented strip portions in comparison with the non-indented strip portions, each of said indented strip portions having a hole therethrough, and a plurality of terminals each including a sleeve shaped insulation member secured in one of said strip holes transversely thereto and a contact member fitted in the said insulation sleeve coaxially with the respective strip hole and electrically insulated from the base strip.

2. A stock material as defined in claim 1, wherein the said metal strip is coated with a coat of insulation material.

3. A stock material as defined in claim 1, wherein the said metal strip is made of aluminum having an anodized finish.

4. A stock material as defined in claim 1, wherein the said insulation sleeve is transversely divided in two parts disposed on opposite sides of the respective strip portion and said contact member is in form of a metal sleeve joining said two parts of the insulation sleeve.

5. A stock material according to claim 1, wherein the said contact member is in form of a metal sleeve, one end of said sleeve being extended to form a tail for connecting a wire to the terminal.

References Cited in the file of this patent

UNITED STATES PATENTS

| Number | Name | Date |
|---|---|---|
| 799,748 | Mills | Sept. 19, 1905 |
| 914,327 | Barbour | Mar. 2, 1909 |
| 926,451 | Addie | June 29, 1909 |
| 1,316,001 | Teachworth | Sept. 16, 1919 |
| 1,936,296 | Fairbanks | Nov. 21, 1933 |
| 2,260,459 | Kilar | Oct. 28, 1941 |
| 2,396,725 | Thomas, Jr. | Mar. 19, 1946 |

(Other references on following page)

UNITED STATES PATENTS

| Number | Name | Date |
|---|---|---|
| 2,433,358 | Garberding | Dec. 30, 1947 |
| 2,456,118 | Foster | Dec. 14, 1948 |
| 2,474,356 | Harris | June 28, 1949 |
| 2,510,339 | Heiss | June 6, 1950 |
| 2,624,775 | Hughes | Jan. 6, 1953 |
| 2,641,747 | Johanson | June 9, 1953 |

FOREIGN PATENTS

| Number | Country | Date |
|---|---|---|
| 628,698 | Great Britain | Sept. 27, 1947 |
| 926,860 | France | Oct. 14, 1947 |